United States Patent
Aakolk et al.

(10) Patent No.: US 10,769,294 B2
(45) Date of Patent: Sep. 8, 2020

(54) ASYNCHRONOUS UPDATE OF EXPLOSION DEFINITIONS BASED ON CHANGE TRIGGERS FOR EVALUATION OF AUTHORIZATION RIGHTS

(71) Applicant: SAP SE, Walldorf (DE)

(72) Inventors: Michael Aakolk, Wiesloch (DE); Andrea Waldi, Viernheim (DE)

(73) Assignee: SAP SE, Walldorf (DE)

( * ) Notice: Subject to any disclaimer, the term of this patent is extended or adjusted under 35 U.S.C. 154(b) by 303 days.

(21) Appl. No.: 15/652,308

(22) Filed: Jul. 18, 2017

(65) Prior Publication Data
US 2019/0026484 A1 Jan. 24, 2019

(51) Int. Cl.
*G06F 21/62* (2013.01)
*G06F 21/60* (2013.01)
*G06Q 20/22* (2012.01)
*H04L 29/06* (2006.01)

(52) U.S. Cl.
CPC ........ *G06F 21/6227* (2013.01); *G06F 21/604* (2013.01); *G06Q 20/229* (2020.05); *H04L 63/10* (2013.01); *H04L 63/101* (2013.01); *H04L 63/20* (2013.01); *G06F 2221/00* (2013.01); *G06F 2221/2113* (2013.01); *G06F 2221/2141* (2013.01); *G07C 2209/04* (2013.01)

(58) Field of Classification Search
CPC . H04L 63/1425; H04L 41/12; H04L 65/4053; H04L 41/024; H04L 41/0893; H04L 63/10; H04L 63/101; H04L 63/20; G06F 16/284; G06F 21/6227; G06F 21/604; G06F 2221/00; G06F 2221/2113; G06F 2221/2141; G06F 21/62; G06F 21/60; G06Q 20/229; G07C 2209/04
See application file for complete search history.

(56) References Cited

U.S. PATENT DOCUMENTS

| | | | | |
|---|---|---|---|---|
| 2002/0161757 A1* | 10/2002 | Mock | ...................... | G06F 16/24 |
| 2006/0137019 A1* | 6/2006 | Dettinger | ............ | G06F 21/6218 726/27 |
| 2008/0301780 A1* | 12/2008 | Ellison | ................ | G06F 21/6218 726/4 |
| 2012/0109917 A1* | 5/2012 | Comeau | ................ | G06F 16/282 707/703 |
| 2013/0322608 A1* | 12/2013 | Jesse | ..................... | H04M 3/493 379/88.01 |

* cited by examiner

Primary Examiner — Alexander Lagor
Assistant Examiner — Howard H. Louie
(74) Attorney, Agent, or Firm — Fish & Richardson P.C.

(57) ABSTRACT

A hierarchy of object groups is defined. Objects group collections are defined on top of the hierarchy. Authorization rights for executing actions are defined through the object group collection definitions. A request for a change associated with assignments of an object group in a hierarchy of a plurality of object groups may be received, where the assignments are related to object group collections. A change trigger is stored at an explosion update trigger table. The change trigger is stored synchronously with updating definitions of the object group collections and/or updating the hierarchy organization. The explosion update trigger table is processed to determine changes for the explosion table. The change trigger may be processed together with one or more other triggers associated with the object group. The explosion table is updated to reflect changes to the object group and other object groups hierarchically inherent for the object group.

16 Claims, 12 Drawing Sheets

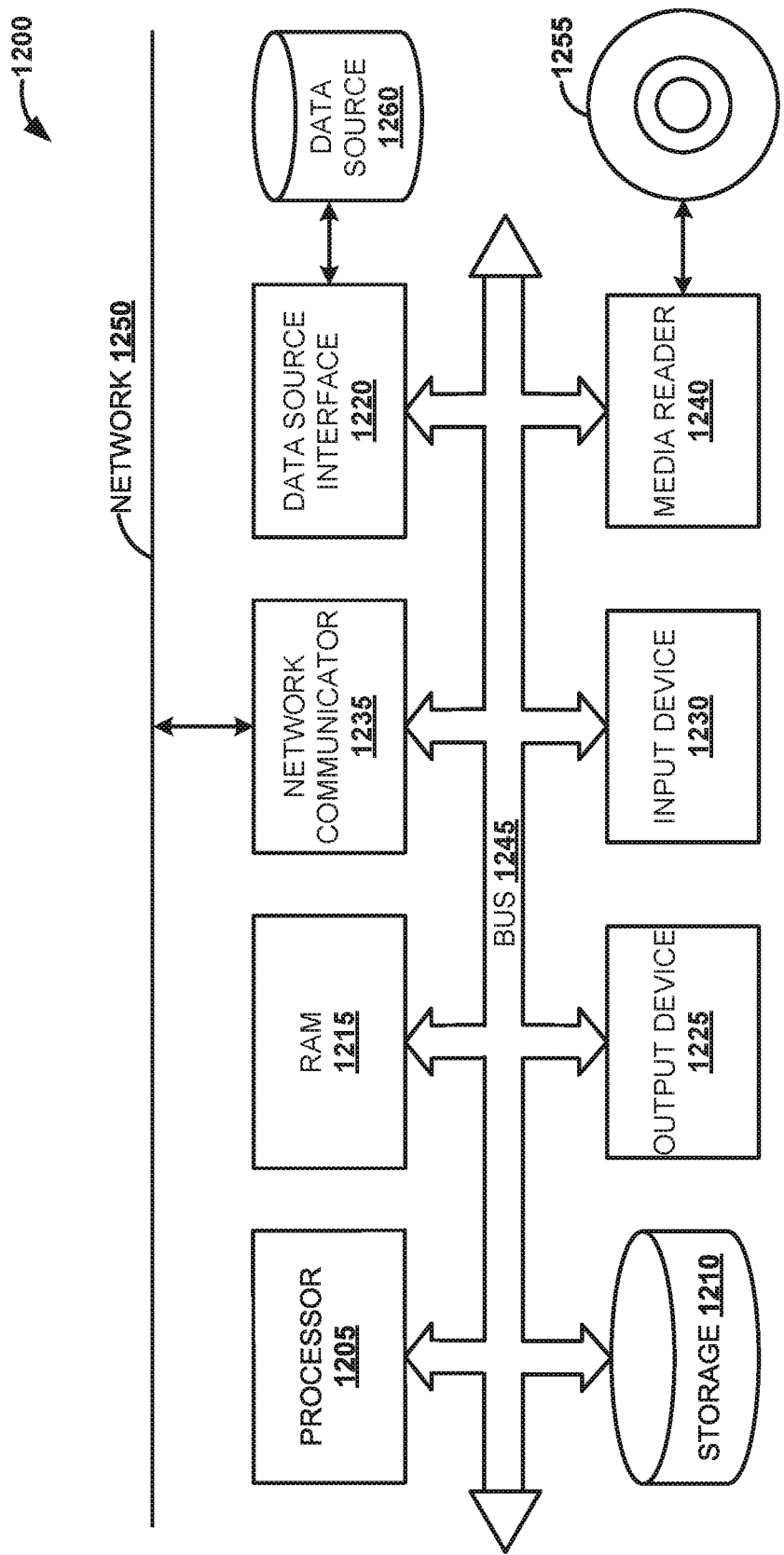

ASYNCHRONOUS UPDATE OF EXPLOSION DEFINITIONS BASED ON CHANGE TRIGGERS FOR EVALUATION OF AUTHORIZATION RIGHTS

BACKGROUND

User accounts may be created to control access to applications. A user name and a password may be assigned to a person or partner who works with an application. User roles may be assigned to accounts, and determine types of access that users are allowed when using the application. For example, a group of users may be defined, where a user from the group may view an application's content and make changes to that content. Such a group of users may be assigned to the role "Author". An application's administrator can modify access rights for defined roles or create new roles.

The object instances associated with the application may be associated with different authorization rights for different users. The object instances may be defined based on a data model, including a definition of attributes for the objects. Object instances may be organized in a hierarchical manner according to hierarchy criteria, such as location, time, etc. When users log in an application, they provide their user names and passwords to start an authentication process. Authenticated users may perform actions and/or operations on object instances associated with the application. User may be part of different user groups having different roles. Authenticated users group includes users whose identities were authenticated when they logged in the application.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 12 is a block diagram illustrating an embodiment of a computing environment in which the techniques described for providing authorization for executing an action on object instances to users based on defined capabilities can be implemented.

DETAILED DESCRIPTION

Embodiments of techniques for defining asynchronous updates for explosion definitions based on change triggers are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
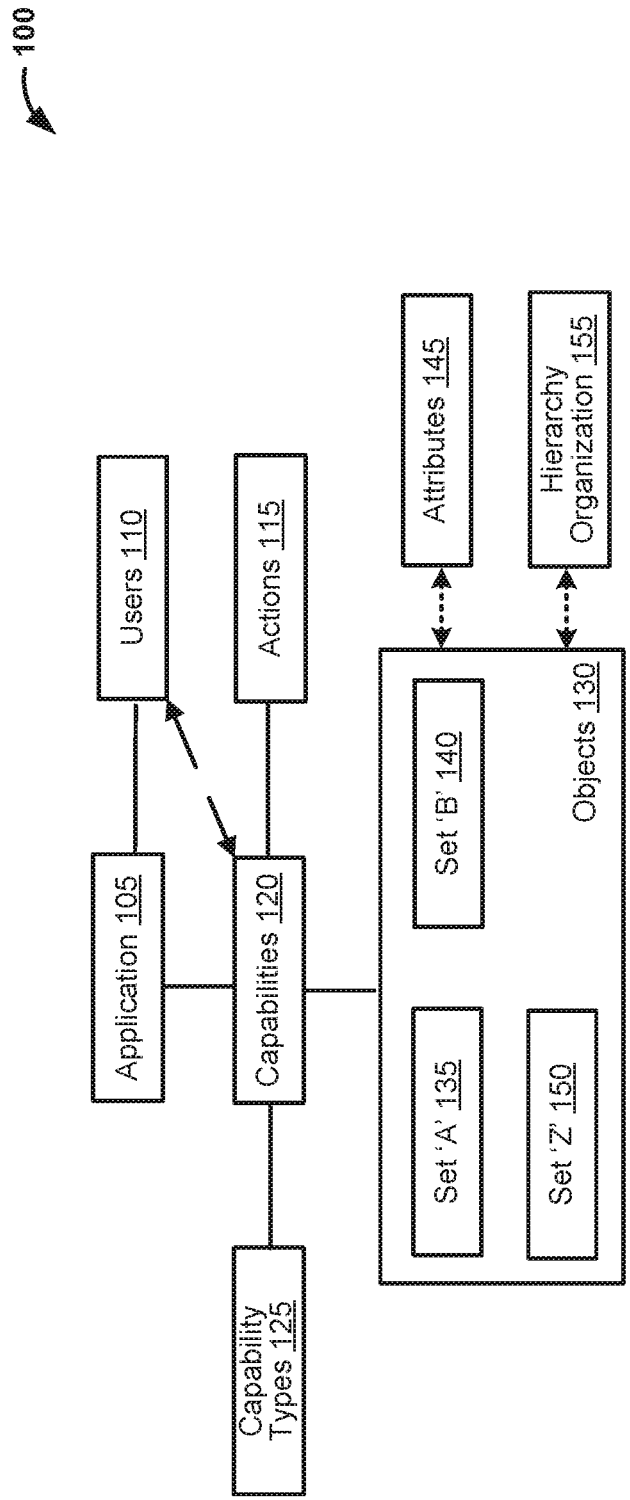
FIG. 1 is a block diagram illustrating an exemplary system for providing user authorization to execute actions on object instances based on defined capabilities, according to one embodiment.

FIG. 1 is a block diagram illustrating an exemplary system 100 for providing user authorization to execute actions on object instances based on defined capabilities, according to one embodiment. Application 105 is a software application or an application service, which provides functionality to be consumed by users 110. Users 110 may be associated with different roles and may be able to perform different tasks based on authorization rights. A definition of the authorization rights for object instances associated with an application may be provided in relation to specified actions. The authorization rights may be determined based on attributes of the objects instances and on hierarchy organization of the object instances. For example, a user may be allowed to enter information associated with clients in the application 105. Users 110 may be allocated into user groups. The application 105 is associated with capabilities 120. The capabilities 120 specify how different rights are provided to users 110 for performing relevant actions on relevant sets of objects. The capabilities 120 are associated with a list of actions defined in block actions 115. The capabilities 120 are associated correspondingly with objects 130 that are related to the application 105. The objects 130 are associated with provided functionality based on implemented logic of the application 105. A user from users 110 may be associated with a capability X from the capabilities 120. The capability X may define that the user is authorized to perform an action, such as a read operation, on a given object or a set of objects from objects 130. For example, the capability X may be associated with a single object from the objects 130, or may be associated with a group of objects, for example, grouped based on a common characteristic, order, etc. In one example, the objects 130 may be divided into different groups, such as set 'A' 135, set 'B' 140, and/or set 'Z' 150.

The objects 130 may be defined according to an object model defining different attributes, such as attributes 145. Data for the objects 130 may be stored in database tables including attributes (columns) to describe the object instances. An object from the objects 130 may be associated with one or more attributes from the attributes 145. The objects 130 may also be associated with a hierarchy organization 155. The hierarchy organization 155 may specify hierarchical relationships between groups of objects. The hierarchy organization 155 comprises hierarchy levels, which may be used to allocate an object to a certain hierarchy level. For example, hierarchy organization may be defined for objects that are associated with different locations, which may be generalized in a hierarchy order. A location hierarchy order may be such as world, country, region, city, etc.

In one embodiment, the capabilities 120 may be defined on an attribute basis and on hierarchy basis. In such manner, the capabilities are defined with a unified authorization approach to both attributes and hierarchy organization. Objects from the objects 130 are associated with actions from the actions 115. The capabilities 120 may be defined in relation to specific actions and associated objects. Objects are associated with an action based on criteria related to the attributes 145 and the hierarchy organization 155. Capability types 125 serve as a template for the capabilities 120. The Capability types 125 include definitions of a mapping between authorization rights, users, and objects from objects 130. Properties of a given capability are defined by the capability type, from which it is derived. In some embodiment, the Capability types 125 may be treated as low-level content. The Capability types 125 may be hard-coded, predefined and delivered by the application product provider.

Based on a received request from a user to perform an action, the application 105 may provide an authorization result to the user, which specifies whether the user is authorized to perform the requested action on objects from the objects 130. Capabilities may be used to determine how to determine the authorization results that are given to users in relation to the objects 130. An evaluation of the objects 130 may be performed through filtering the objects based on the defined capabilities. A filtering term may be defined when evaluating whether the user has authorization rights to perform an action X on requested object Y. When a filtering term, defined in relation to object Y, is evaluated to true, then the user may be authorized to execute the action X. The corresponding capability types may be used to determine whether capabilities with associated actions and determined filter terms are well defined.

Figure 2:
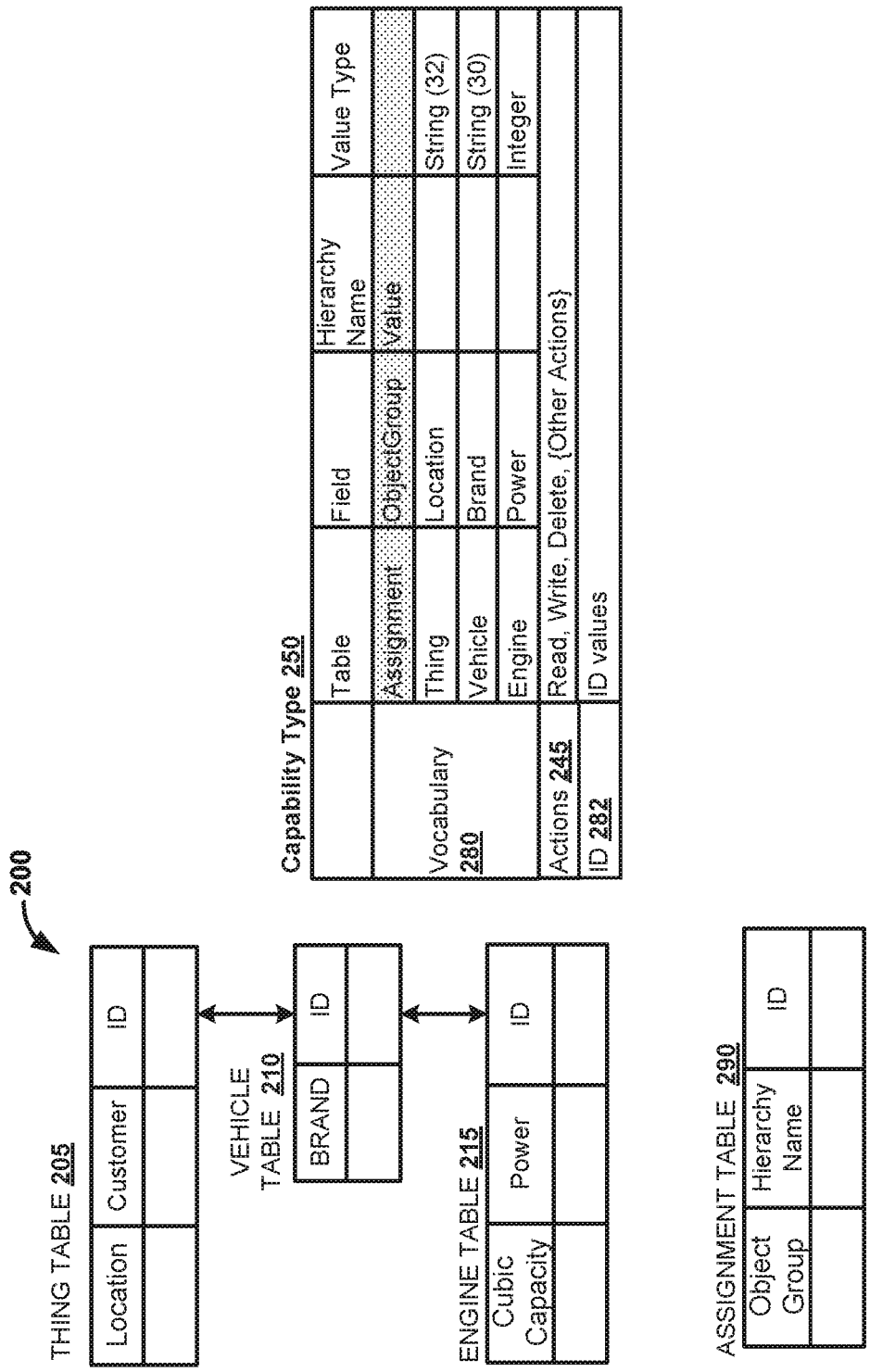
FIG. 2 is a block diagram illustrating an exemplary model for defining objects and a vocabulary related to a definition of a capability, according to one embodiment.

FIG. 2 is a block diagram illustrating an exemplary model 200 for defining objects and a vocabulary related to a definition of a capability, according to one embodiment. The exemplary model 200 includes definitions of entity types. The entity types are presented as tables, which include column fields. The exemplary model 200 may be used for creating objects such as objects 130, FIG. 1. The objects may be associated with an application and authorization rights for actions to be performed by users. The exemplary model 200 includes a thing table 205, a vehicle table 210, and engine table 215. The exemplary model 200 describes objects based on the defined fields in the tables. The column fields in the tables from the exemplary model 200 are attributes of the objects instances that are created based on the exemplary model 200. The thing table 205 includes column fields—location, customer, identifier (ID). The vehicle table 210 includes column fields—brand, identifier (ID). The engine table 215 includes column fields—cubic capacity, identifier (ID). The thing table 205, vehicle table 210 and the engine table 215 may be linked based on key fields, such as the ID field.

In one embodiment, for the exemplary model 200 a capability type 250 may be defined. The capability type 250 is created to specify authorizations for performing actions over objects from the entity types defined in the exemplary model 200. The capability type 250 can be from the capability types 125 described above with respect to FIG. 1. The capability type 250 may be an example of a number of capability types, which may be defined for an application. The exemplary model 200 is associated with a main table, which is thing table 205. Therefore, in the current FIG. 2 we may denote that capability type 250 is a "thing" capability type. The capability type 250 includes a definition of a vocabulary 280 and a definition of actions 245. Objects created based on the exemplary model 200 may be associated with authorization rights to perform actions based on attributes of the objects. The vocabulary 280 is created for the exemplary model 200 to include attributes of objects instances, which are relevant for determining authorization rights for users over object instances. The vocabulary 280 includes attributes corresponding to the defined fields in the entity tables. The vocabulary 280 defines a set of columns corresponding to table names, field names, and value type data for the fields. The fields column includes the attributes that are associated with authorization. The attributes that are included in the vocabulary are the brand attribute, the location attribute, and the power attributes.

Further, the capability type 250 includes a definition of actions 245 that may be performed to object instances, created based on the exemplary model 200. The capability type 250 may be defined to include also a definition of a capability type ID.

The authorization for performing actions over objects may be associated with assignment of object instances into a hierarchy organization. For example, authorization for performing actions may be related to objects that are of a certain brand, but also part of a hierarchy organization of the object instances. As discussed in relation to the hierarchy organization 100, FIG. 1, object instances created based on a model may be grouped, and groups may be allocated to hierarchy levels. Such hierarchy may be for example based on the location attribute of object instances. One object instance may have an attribute value for location equal to Munich. and a second object instance may have an attribute value for location equal to Barcelona. Both of these objects may be grouped and associated with a hierarchy level city, and the next hierarchy levels may be country, region, etc. A hierarchy with hierarchy levels, where object groups are defined, includes the notion that object groups of a higher level inherently include object groups from lower levels, where such object groups are in a parent-child relationship to the higher level object group.

Therefore, to reflect the authorization related to hierarchy organization, the capability type 250 may include an assignment record for the objects, where the field column defines the object group to which the object instances is assigned.

The assignment of objects to object groups and hierarchies may be stored at an assignment table 290. The assignment table 290 includes columns specifying the object group, an ID, and a hierarchy name. There may be several hierarchies defined for a set of objects. For example, one hierarchy may be defined on an organizational basis, and another hierarchy may be defined in relation to executed sales activities. The assignment record at the vocabulary 280 identifies the hierarchy name for the hierarchy to which the object is assigned. The name of the hierarchy may be taken from an assignment table 290.

In one embodiment, the capability type 250 may be defined to include also a definition of a capability type ID 282. For example, the capability type 250 may be defined for different types of objects, as defined in the exemplary model 200. The "things" stored at the thing 205 table may be bicycles and cars. Therefore, a capability type ID may reflect the difference of these objects by defining two possible IDs corresponding to bicycles and cars. Therefore, the capability type ID 282 record in the capability type 250 may be associated with predefined ID values corresponding to types of objects.

In one embodiment, the object instances generated based on the model 200 and for which the capability type 250 is defined may also be associated with authorization rights based on assigning of object instances to object group collections. Object group collections may include one or more object groups that have a hierarchical inheritance. The object group may be assigned to be included in a given object group collection. Specific rules for including and excluding objects groups from an object group collection may be declared. For example, an object group collection A includes all of the objects that correspond to object instances associated with "Europe" location, except for object instances from city "Munich".

The vocabulary 280 may include two assignment records, where a second record may correspond to an assignment of an object instance to an object group, which is associated with a second hierarchy definition. The second hierarchy definition may be related to the assignment table 290. An instance of a Capability Type may be associated with a user group related to an application providing access to object instances, created based on the exemplary model 200. The object instances may be stored at a database related to the application. The user group may be associated with an application, such as the application 105, FIG. 1.

Capability objects, defined based on a capability type, such as the capability type 250, may be created to specify a set of objects in the database, on which set users may perform actions. Actions of the actions from the capability type are selected when creating the capability object. The multiple dimensions of authorization that are involved in defining a capability may be grouped as presented in Table 1 below.

TABLE 1

| Dimension Authorization | Explanation |
| --- | --- |
| Object set | Set of objects that a user can access defined by a filter expression. The filter expression can be based on specific field values of a particular object instance such that granting the authorization is based on the presence (or absence) of a particular value. The filter expression may be based on expressions including terms generated based on in a vocabulary included in a corresponding capability type, from which the capability is derived. |

TABLE 1-continued

| Dimension Authorization | Explanation |
| --- | --- |
| User groups | A set of user groups of which at least one user must be assigned to be able to perform the actions defined by the capability. |
| Actions | different actions (e.g. read, write, delete) that the user (or user group) can perform on the object instances defined by the object set. |

A capability "A" may be created based on the capability type 250. The capability "A" includes an ID, a list of actions, and a condition. The condition may be is based on a vocabulary 280 in the capability type 250. In the definition of capability "A", a set of objects for which access is granted may be determined based on evaluation of the condition. In the condition field, a complex filter expression can be generated, which allows to restrict access not only to objects of a particular type, but to objects of a particular type with a particular value in one of its fields (or with different values in a list of its fields). Access rights may be defined on a fine level of granularity. For example, such fine level granularity may provide a clear segregation of authority, which is required to fulfill data protection requirements for the application providing access.

Figure 3:
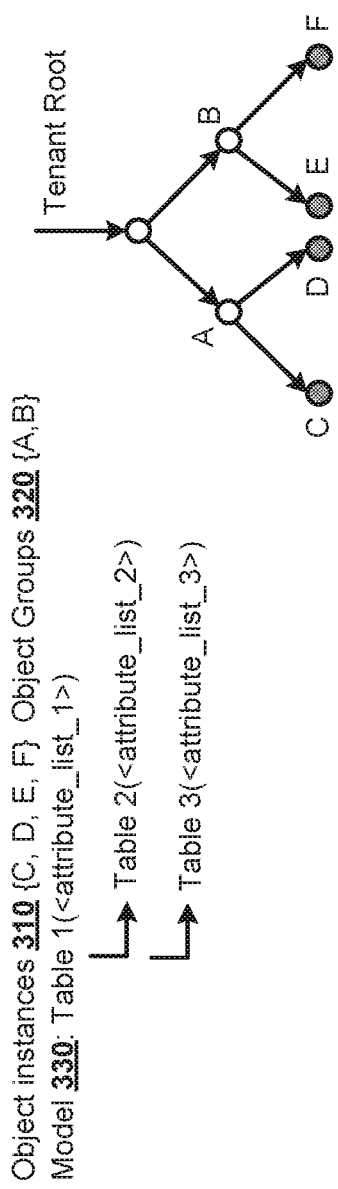
FIG. 3 is a block diagram illustrating an exemplary definition of object instances according to an entity model and a hierarchy organization, according to one embodiment.

FIG. 3 is a block diagram illustrating an exemplary hierarchy organization 300 of object instances, defined on an entity model including attributes, according to one embodiment. Objects, such as the objects 130 discussed in relation to FIG. 1, may be organized in the hierarchy organization 300 including hierarchy levels of separation between object groups. For example, the objects may include object instances 310—objects C, D, E. and F. The object instances 310 may be grouped in object groups 320—groups A and B. The objects C, D, E, and F, may be defined according to a model 330, which includes a set of tables—table 1, table 2, and table 3. The tables include a list of attributes, which may be represented as columns of the tables. Such list of attributes defines characteristics of the objects C, D, E, and F. The model 330 may include relationships between the tables. In the hierarchy organization 300, objects C and D are part of group A, and objects E and F are part of group B. The definition of these groups A and B is on a hierarchy basis. For example, if the objects represent goods, one exemplary hierarchy organization may be the associated location of goods—Europe for group A, and North America for group B.

Figure 4:
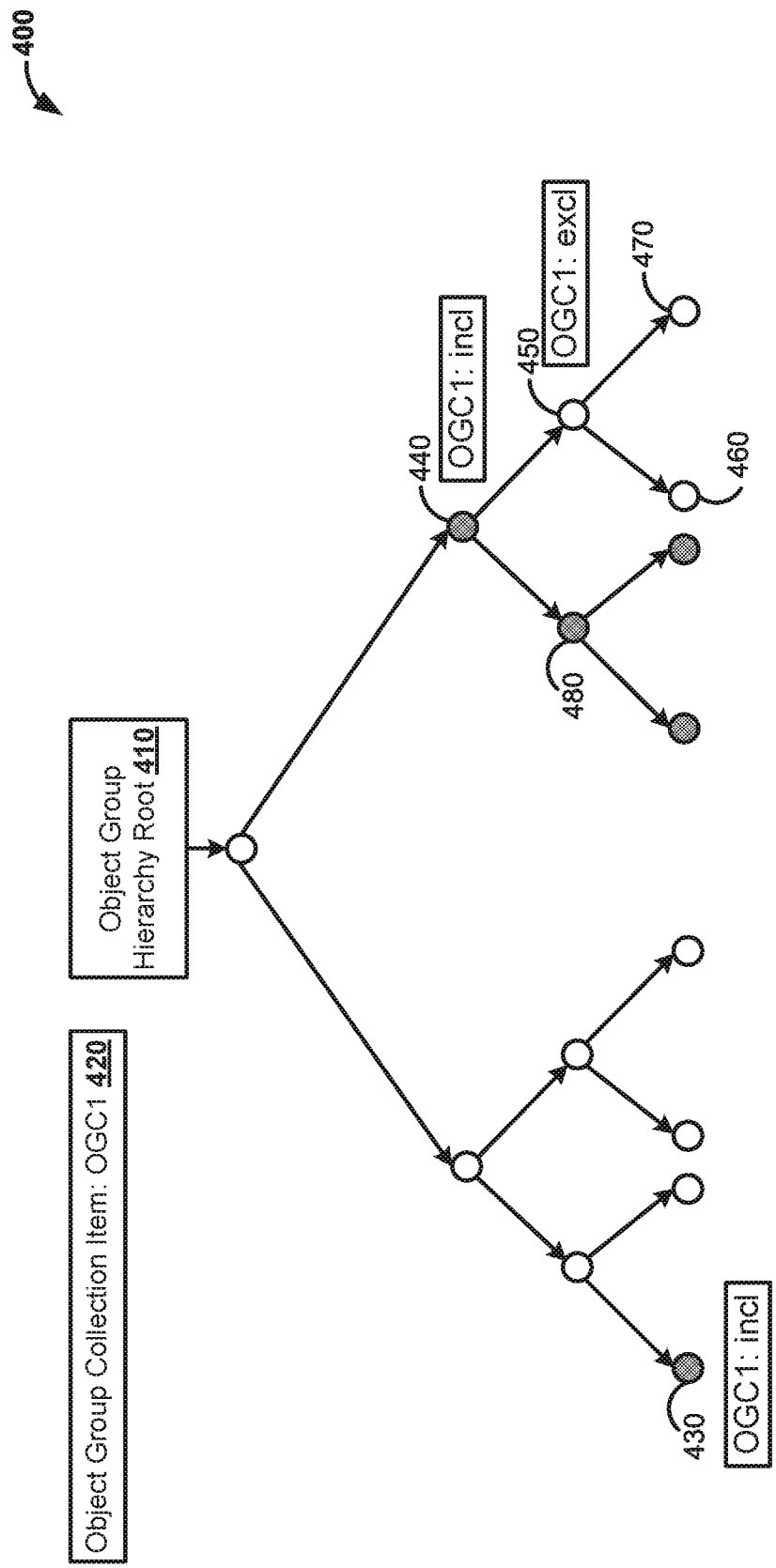
FIG. 4 is a block diagram illustrating a hierarchy organization of object instances and a definition of an object group collection, according to one embodiment.

FIG. 4 is a block diagram illustrating a hierarchy organization 400 of object instances and a definition of an object group collection, according to one embodiment. The hierarchy organization 400 may correspond to the discussed hierarchy organization 300. FIG. 3. The hierarchy organization 400 may be defined for object instances, stored at a database associated with an application, such as the application 105, FIG. 1. The hierarchy organization 400 of object instances may be associated with providing authorization rights to users to perform actions on the object instances. The hierarchy organization 400 may be defined to correspond to logic for providing authorization access to object instances in relation to their hierarchy position. A hierarchy organization 400 may include four hierarchy levels to which objects may be allocated. A hierarchy level defines hierarchy characteristics, which are different for different object instances stored at a database. Nodes from the hierarchy organization 400 represent object groups, which are ordered in a hierarchical manner. The hierarchy organization 400 is defined as a tree structure, where an upper hierarchy level comprises object groups with different hierarchy characteristics values. For example, to a hierarchy "Country", the objects instances from a first object group may be associated with country "USA", and a second object group may be associated with country "Canada". The object groups positioned on a hierarchy level of the correspondingly included objects instances. The hierarchy organization 400 includes nodes, which represent different object groups. An object group hierarchy root 410 node corresponds to a higher hierarchy level. A second hierarchy level, below root level, includes 2 object groups, which are distinguishable based on a second hierarchy level criterion correspondingly defined. Based on the hierarchy organization 400 for object groups, object group collections may be defined. An object group collection may include object groups of different levels from the hierarchy organization. An object group at a higher level includes the objects groups, which are in parent-child relationships to the object group. The parent-child relationships between object groups are defined and interpreted based on the graph definition for the hierarchy organization 400. In the hierarchy organization 400, object group 440 includes object group 480 and object group 450, and object groups at the lowest third level.

In one embodiment, a collection of object groups "ObjectGroup90Collection: OGC1" 420 is defined. The OGC1 420 is such a collection, which includes the crossed marked object group nodes on the hierarchy organization 400. The OGC1 420 includes object group 440. The object group 440 inherently includes the nodes that are linked to it at lower levels. The OGC1 420 may exclude or include some additional object groups defined at the hierarchy organization 400. The OGC1 420 may be defined to exclude object group 450. The object group 450 inherently includes the nodes linked to it at the lower level—object group 460 and object group 470. Therefore, object groups 460 and 470 are also excluded from OGC1 420. The OGC1 420 may be defined to include additionally object instances from object group 430. As a result, the object groups included in OGC1 420 are object group 430 and object group 480, where object group 480 includes the nodes from the graph that are directly linked.

In one embodiment, the hierarchy organization 400 may be rearranged. For example, the nodes from the left handside of the tree structure, may be repositioned below a node from the lowest level of the right-hand side tree. When such a reorganization of the hierarchy arrangement is performed, the inheritance of object groups of lower levels to connected object groups of higher levels is persisted. After such a rearrangement is performed, the interpretation of which groups are associated with an object group collection is about to be updated, and the inheritance of inclusion of object groups is followed according to the new hierarchy organization. For example, if the left hand-side tree is connected to node 470, then all of the nodes from the left hand-side tree are to be excluded from OGC1 420, as all of the nodes are associated with a node—node 470, which is excluded from the OGC1 420.

Figure 5:
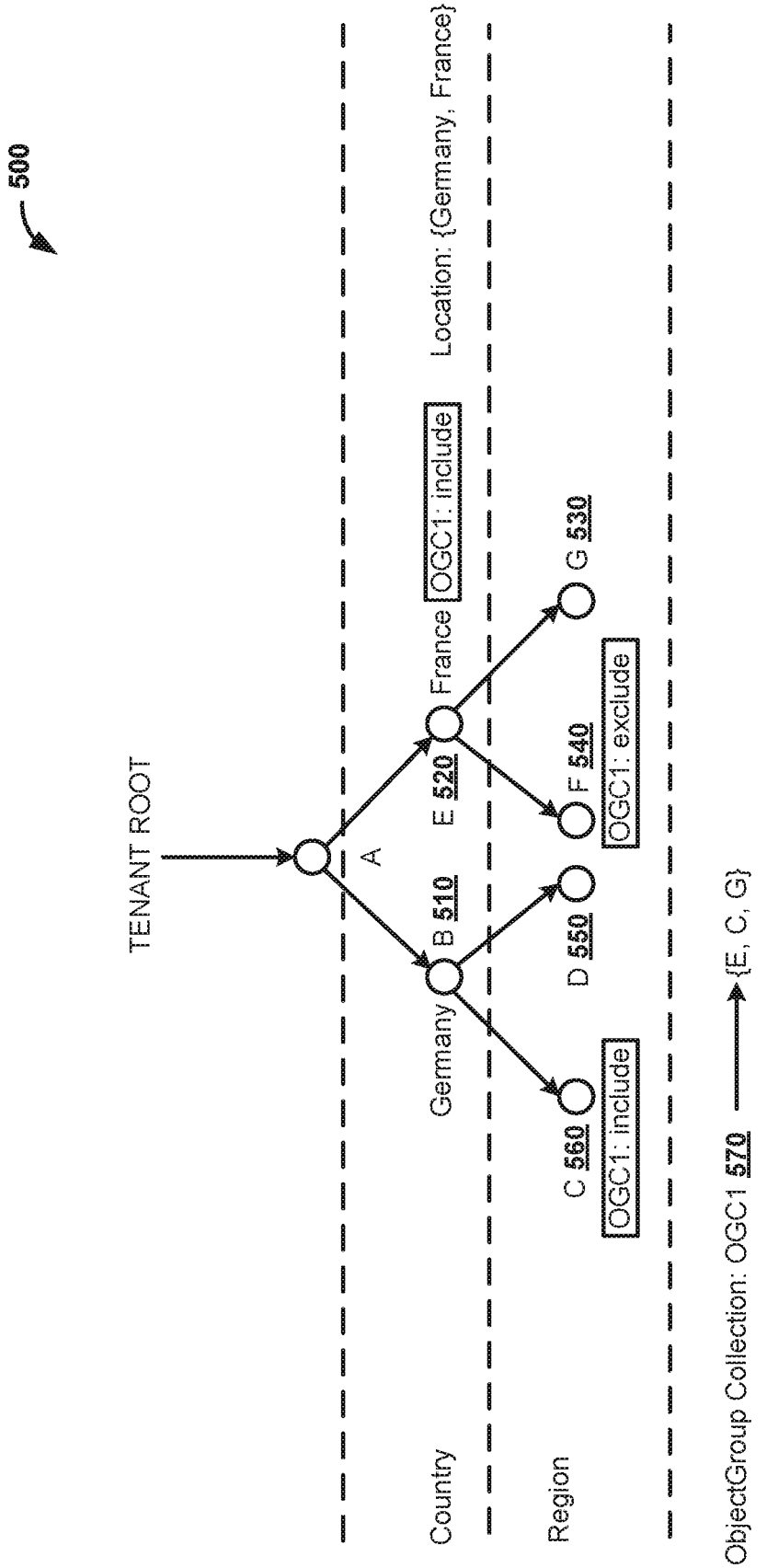
FIG. 5 is a block diagram illustrating an exemplary hierarchy organization of object instances and an exemplary definition of an object group collection, according to one embodiment.

FIG. 5 is a block diagram illustrating an exemplary hierarchy organization 500 of object instances and an exemplary definition of an object group collection, according to one embodiment. The exemplary hierarchy organization 500 of object instances defines a hierarchy associated with a different location. The location of the objects is used to create the hierarchy. The hierarchy may include location hierarchy levels, such as world, country, region, city, etc. The exemplary hierarchy organization 500 presents object groups at 3 hierarchy levels, namely, world, country, and region. At the first hierarchy level—world, there is just one object group, which is the tenant root node. All of the object instances are associated with a location point somewhere in the world.

At a hierarchy level "Country", there are two object groups—object group Germany B 510 and object group E 520 France. At a hierarchy level "Region", there are 4 object groups. Object group C 560 and object group D 550 are child nodes of object group Germany B 510. These object groups—object group C 560 and object group D 550, represent regions in Germany. Object group F 540 and object group G 530 are child nodes of object group E 520 France. These object groups—object group F 540 and object group G 530, may represent regions in France.

An object group collection—OGC1 570 is defined based on the exemplary hierarchy organization 500. The OGC1 570 is created to include object instances from object group E 520 and object group C 560. Object groups that are inherently connected to object groups E 520 and C 560 are also included in the OGC1. The OGC1 570 may be declared to exclude object instances from object group F 540. Therefore, as a result, the OGC1 570 includes object instances from object groups from the lowest hierarchy level, which are the object group C 560 and the object group G 530, as presented on FIG. 5.

In one embodiment, a definition of an object group collection may be provided in form of a table, where the collection name is defined together with included object groups. As there is a possibility to explicitly exclude an object group from a collection, where the excluded object group is inherent to previously included object group at a higher hierarchy level, explosion tables may be defined.

In one example, a hierarchy "X" includes an object group 1—OG1, which is inherited by OG1.1 and OG1.2. Hierarchy "X" may be presented in a tree structure having three nodes. A root node for the tree structure may be associated with OG1, and two child notes to the root node are associated with OG1.1 and OG1.2. An OGC1 is created in relation to the hierarchy "X". OGC1 is defined to include OG1 and to exclude OG1.2. Table 2 represents object groups associated with the definition of the OGC1, together with their inclusion status in the collection in the "Included" column. The OGC1, as presented in Table 2, is described based on columns "Object Group", "Object Group Collection" and "Included". The "Object Group" and "Object Group Collection" columns define which is the name of the object group and the corresponding object group collection. Table 2 includes only definition of object groups that are included and object groups that are excluded.

The "Included" column defines two possible values—true and false.

TABLE 2

| Object Group | Object Group Collection | Included |
| --- | --- | --- |
| OG1 | OGC1 | True |
| OG1.1 | OGC1 | False |

The OGC1 includes the OG1 and excludes OG1.1. OG1 is inherited by object groups—OG1.1 and OG1.2. Therefore, the OG1.2 as a direct child to OG1 is inherently included in OGC1. Table 3 presents an explosion table, which includes the OG1.2, which is inherently included in the collection OGC1. The explosion table—Table 3, includes a definition of all of the object groups that are included in the object group collection, no matter if they are inherent to other object groups from Table 3. The rows of the explosion table correspond to the included object groups in the object group collections, where the included objects groups are inherently presented. For example, if object group "A" is inherited by object group "B" and "C", then groups "A", "B", and "C" are presented with rows in the explosion table.

Therefore, Table 3 includes 3 records (rows), corresponding to the 3 object groups—OG1, OG1.1, and OG1.2. For the explosion table—Table 3, an additional column is defined "Valid Object group". As OG1.1 is not included in the OGC1 collection, the valid object group value for group OG1.1 is defined as the name of the group. OG1.2 is inherently included in the OGC1 collection, as a direct inherent node to the OG1.1. Therefore, the value for the valid object group is the same as the value for the group OG1, namely, OG1. The explosion "Table 3" is defined for the object group collection OGC1, where the object group collection name is defined in the "Object Group Collection" column. However, an explosion table may be defined for a number of object group collections, which may be specified in the "Object Group Collection" column. Storing information for the inclusion and exclusion of object groups from defined object group collections in explosion tables may be used when executing filtering terms defined in conditions in capabilities.

TABLE 3

| Object Group | Valid Object Group | Object Group Collection | Included |
|---|---|---|---|
| OG1 | OG1 | OGC1 | True |
| OG1.1 | OG1.1 | OGC1 | False |
| OG1.2 | OG1 | OGC1 | True |

For example, Table 4 includes an exemplary where clause including a filtering term that is based on data stored in an explosion table. The where clause from Table 4 may be included in a query to extract data for objects defined in a hierarchical manner and associated with a specified object group collection.

TABLE 4

WHERE assignment.ObjectGroup in (
SELECT ObjectGroup FROM explosion as e
  INNER JOIN collectionItem as i
    ON e.validObjectGroup = i.ObjectGroup AND
       e. ObjectGroupCollectionID = i. ObjectGroupCollectionID
       WHERE i.included = true AND
         e.ObjectGroupCollectionID = 'Wanted')

Figure 6:
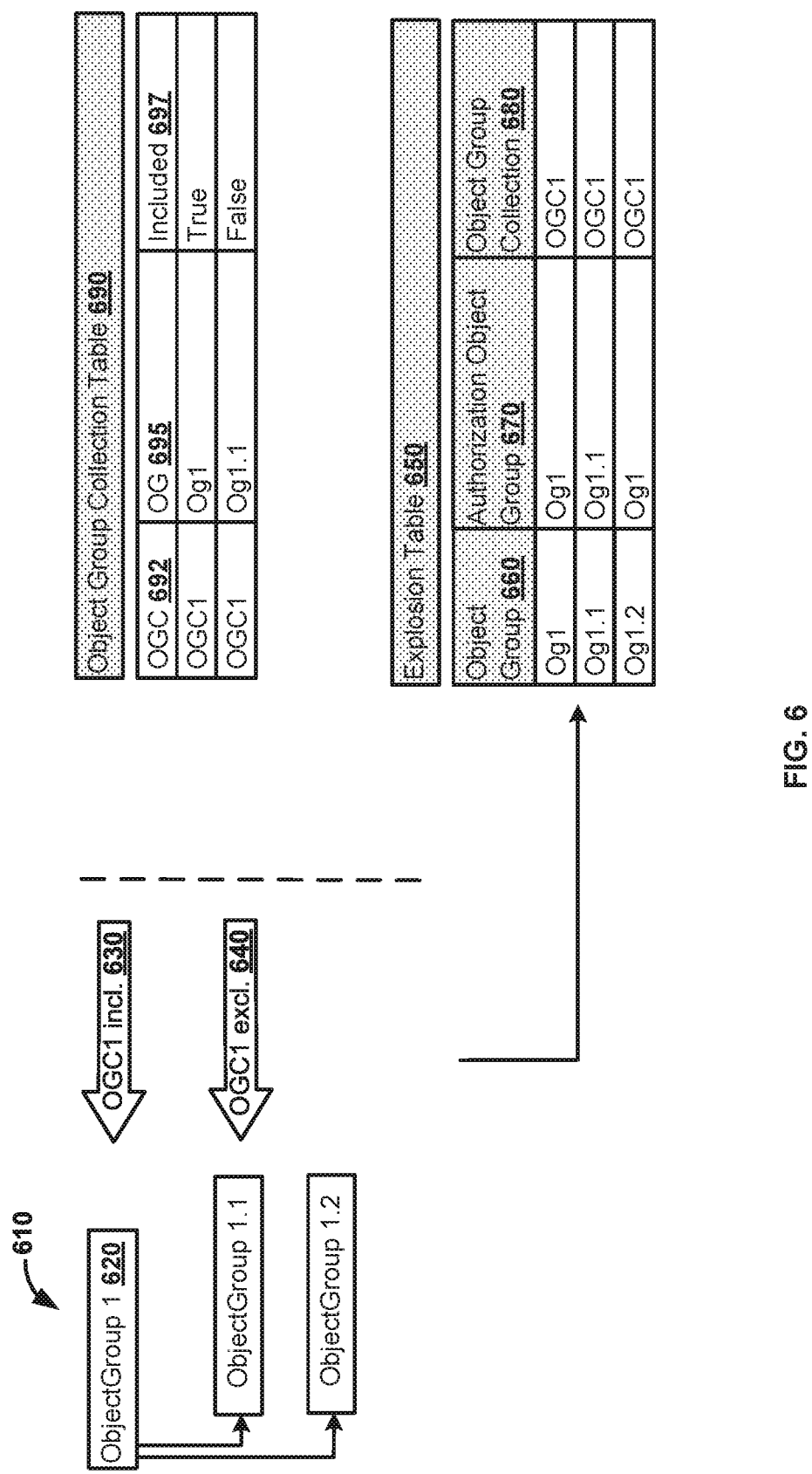
FIG. 6 is a block diagram illustrating an exemplary object group collection definition based on a hierarchy organization and a corresponding explosion table, according to one embodiment.

FIG. 6 is a block diagram illustrating an exemplary object group collection definition based on a hierarchy organization 610 and a corresponding explosion table 650, according to one embodiment. The hierarchy organization 610 may be such as the hierarchy organization 300, FIG. 3. The hierarchy organization 610 is presented as a tree structure, where "ObjectGroup 1" 620 is a root node for the tree structure, and there are two leaf nodes at the tree structure—ObjectGroup 1.1 and ObjectGroup 1.2.

An object group collection table 690 is defined for the hierarchy organization 610, where "ObjectGroup 1" 620 is included in Object Group Collection 1 (OGC1) as defined at 630, and ObjectGroup 1.1 is excluded from the Object Group Collection 1 as defined at 640. When an object group is included in an object group collection item, the inherent object groups to the included group are defined to be also included in the object group collection item, unless otherwise defined. In the presented example for "ObjectGroup 1" 620 inclusion and exclusion definitions for OGC1 at 630 and at 640 (correspondingly). The object group collection table 690 includes two records presented as rows, defining inclusion definition at 630 and exclusion definition at 640 with respect to OGC1. The object group collection table 690 includes 3 columns. The first column is Object Group Collection (OGC) 692 to include details for the collection name or annotation. In the current example, Object Group Collection 1 is annotated with a name OGC1. The second column of the object group collection table 690 is the Object Group (OG) 695 column. The third column of the object group collection table 690 is column Included 697 defining a relationship status of an object group to an object group collection item. The included status defines statuses such as true and false, as the object group is either included or excluded from the object group collection. An object group may be defined as excluded for an object group collection item, when it would be inherently included into the object group collection item, and the collection item is such that the object group should not be part of the collection item. For example, an object group collection item may be defined to include all the object groups of the hierarchy organization 610, but the object groups associated with customer in a particular region, e.g. North America. For the sake of the example, let us take that ObjectGroup 1.1 is a group comprising objects associated with a location North America. In such case, an object group collection, such as OGC1 may be defined to include Object Group 1 620 and to exclude ObjectGroup 1.1. There may be more than one possible definitions for an object group collection to define a same set of object groups to be associated with the collection item.

A row from the object group collection table 690 defines an association between an object group collection item, an object group, and the relationship status. For example, the relationship status may be selected from a set of statuses including status "included" or "excluded". When the status is included, then the object group is defined to be part of the object group collection item together with inherent object groups as defined in the hierarchy organization 610.

The defined object group collection table 690 does not include a reference in a row/record for all of the object groups defined in the hierarchy organization 610. Therefore, the explosion table 650 is created to include records for all of the object groups from the hierarchy organization based on the definitions in the object group collection table 690. The explosion table 650 includes 3 rows associated with the 3 object groups from the hierarchy organization 610. The explosion table 650 includes 3 columns—object group 660 column, authorization object group 670, object group collection 680. The authorization object group 670 column includes data for an object group based on which it may be determined whether the object group referred in the first column (object group 660) is authorized to be included in the object group collection instance defined at the object group collection 680 column. For example, the authorization object group 670 may define a parent object group that has inherent relationship to the object group instance in the record, where the parent object group is defined to be included in an object group collection item at the object group collection table 690.

In one embodiment, to determine which object groups are included in an object group collection item, a join operation may be performed between the explosion table 650 and the object group collection table 690. The join operation may be defined based on the authorizing object group as defined at the authorization object group 670 column, and the object group defined at OG 695 column. For example, based on the join operation, it may be determined that Og 1.1 is not included into OGC1 item, as the second row of Object Group Collection Table 690 defines that the status of Og 1.1 in the Included 697 column is "False", where the authorizing group for Og 1.1 (as defined in the explosion table 650) is Og 1.1 (defined at column 670).

Figure 7:
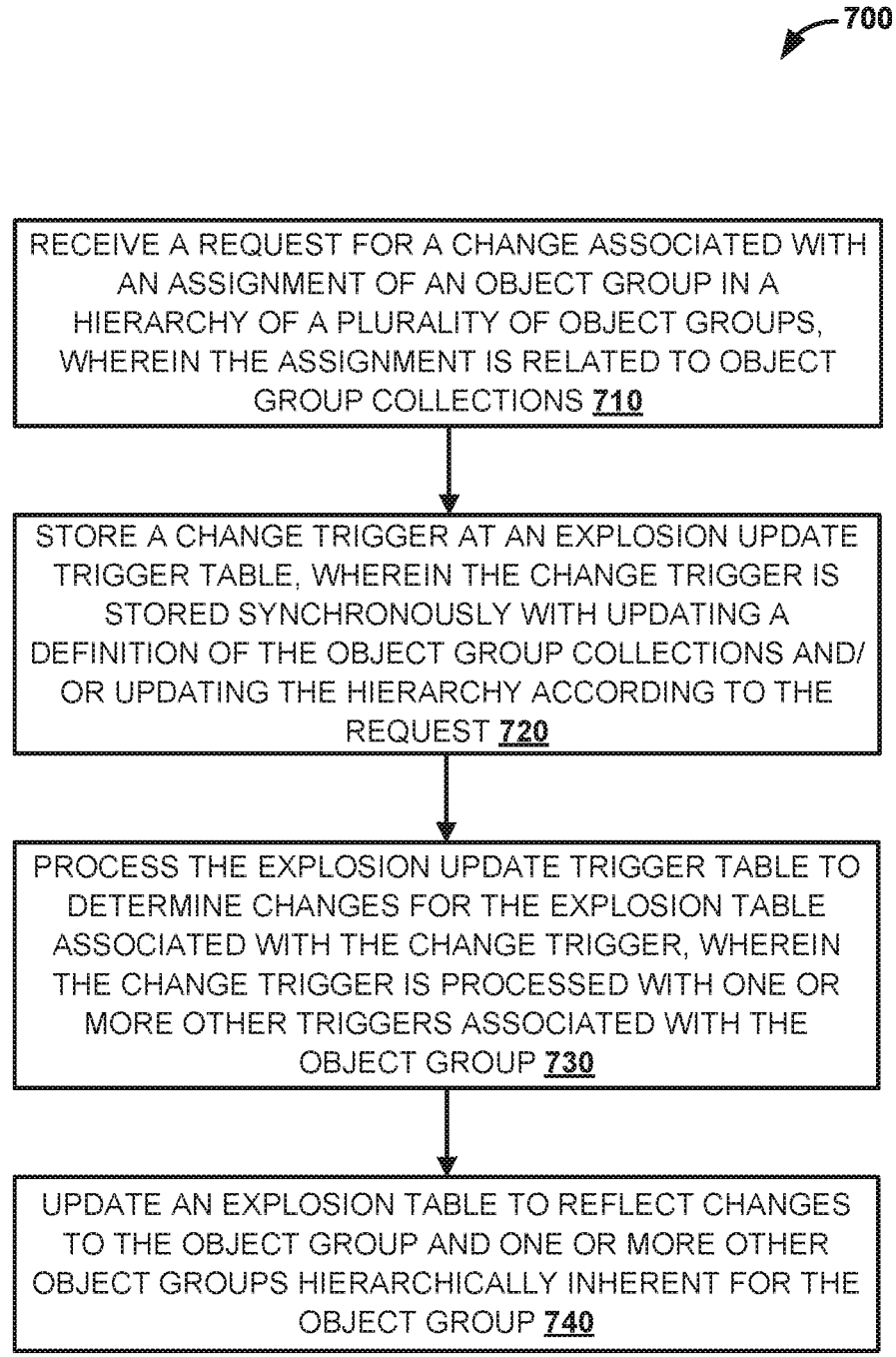
FIG. 7 is a flow diagram illustrating a process for maintaining explosion tables for optimized evaluation of authorization rights, according to one embodiment.

FIG. 7 is a flow diagram illustrating a process 700 for maintaining explosion tables for optimized evaluation of authorization rights, according to one embodiment. At 710, a request for a change associated with an assignment of an object group in a hierarchy of a plurality of object groups is received. The assignment for the object group is related to assignment in an object group collection as defined based on an object group hierarchy. A change in an assignment of an object group may be associated with a change in the hierarchy organization, where such a change may reflect a definition of an already created object group collection. Further, a change in the assignment of the object group may also be related to a change in a definition of an object group collection, for example, to include the object group to an object group collection, and/or to exclude the object group from an already defined object group collection. When a change is to be made at the hierarchy organization or within the definition of object group collections, then an update to an existing explosion table, such as the Explosion table 650 has to be made as well. In such manner, the explosion table will correspond to current version of the hierarchy of object groups and defined collection items based on the hierarchy.

At 720, a change trigger is stored at an explosion update trigger table. The change trigger corresponds to the requested change and is stored synchronously with updating the definition of the object group collections and/or definition of the hierarchy organization of object groups to reflect the requested change from 710. For example, the change trigger may be created when a new object group created, an object group is deleted, reorganization of inheritance of object groups, an object group collection item is deleted, a new object group collection item is created, etc. In one embodiment, a change in the hierarchy organization of object groups may have an indirect effect on the definition of a object group collection item, which was created before the change.

The explosion update trigger table includes rows related to changes initiated for the definition of the hierarchy organization of the plurality of object groups and/or modifications in definitions of object group collections. The changes in the definitions may be related to operations as creating new associations within the hierarchy or within object group collections, deletion of object groups, updates of definitions of object group collections, definitions of new object groups, new object group collections for the hierarchy organization, etc. The change trigger that is stored at 720 is stored synchronously with updating a definition of the object group collection and/or updating the hierarchy according to the request received at 710.

At 730, the explosion update trigger table is processed to determine changes for the explosion tables. The explosion update trigger table may be processed in relation with the change trigger stored at 720. The change trigger is processed from the explosion update trigger table together with one or more other triggers associated with the object group. The explosion update trigger table is evaluated to determine the triggers that are associated with the object group relevant for the object group taken for the processing step 730. All of the rows at the explosion update trigger table associated with one and the same object group may be processed at once.

At 740, the explosion table is updated to reflect changes to the object group (based on the change defined at 710) and one or more object groups hierarchically inherent for the object group. For example, the object group for which a request for a change of assignments is received at 710, may be at a higher level of the hierarchy of object groups, where a couple of other object groups are direct children to that object group, and further grandchildren are defined in the hierarchy. Such inherent object groups, related as children and/or grandchildren (and so on), are taken up for evaluation and changes to the explosion table are made with respect with these object groups, as well as the initial object group associated with the change.

Figure 8:
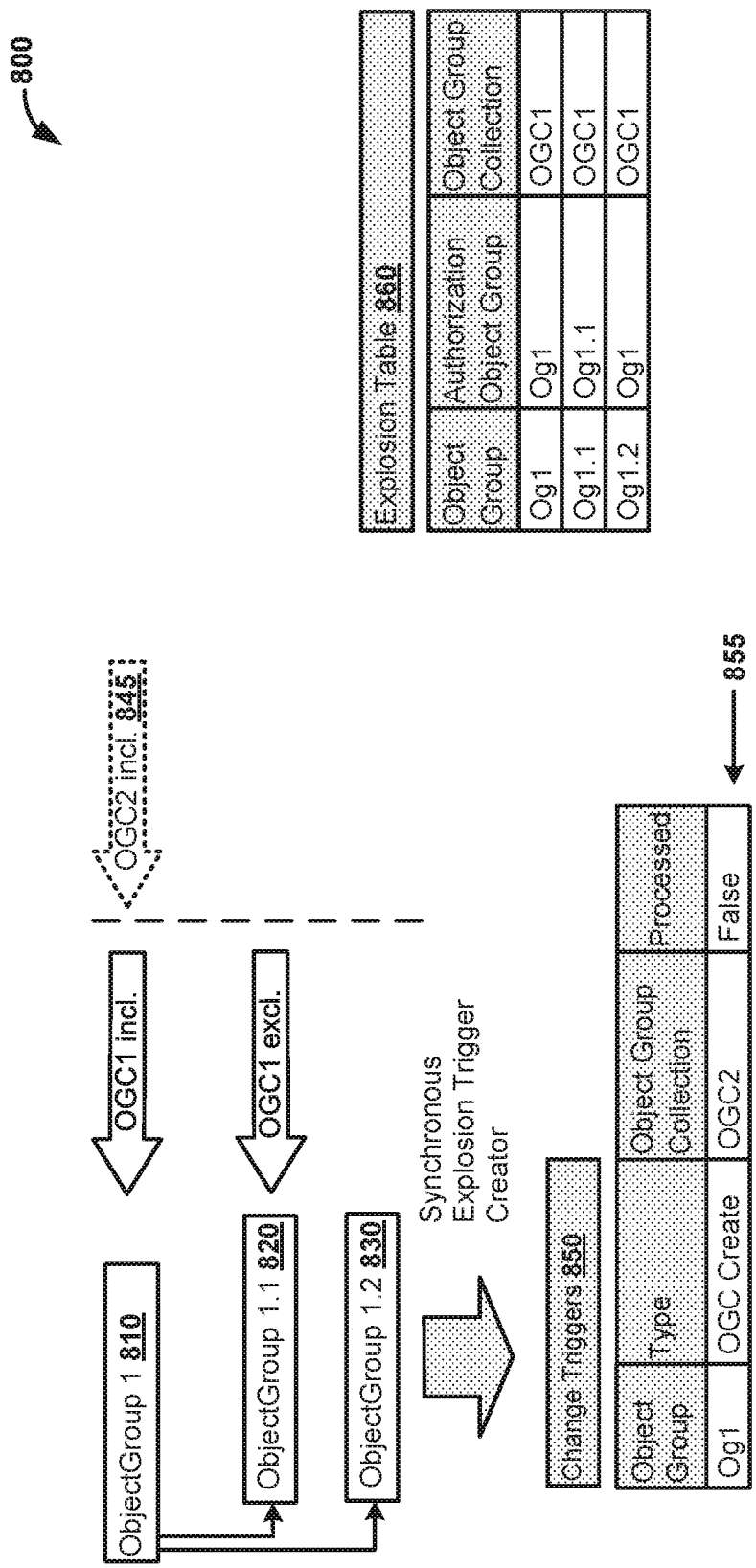
FIG. 8 is a block diagram illustrating explosion trigger creation process, according to one embodiment.

FIG. 8 is a block diagram illustrating explosion trigger creation process 800, according to one embodiment. An object group hierarchy is defined as a tree data structure. The object group hierarchy may be such as the discussed object group hierarchy with respect to the figures and description above. The object group hierarchy includes three object groups, where ObjectGroup 1 810 is a root node. The child nodes in the hierarchy are object group 1.1 820 and ObjectGroup 1.2 830. The object group hierarchy may correspond to the hierarchy organization 600 of FIG. 6. Object group collection 1 is defined, similar to the definition of object group collection 1 in FIG. 6. Object group collection 1 is denoted as OGC1 and includes ObjectGroup 1 810 and excludes ObjectGroup 1.1 820.

A change to the assignment of ObjectGroup 1 810 is initiated based on the change associated with ObjectGroup 1 810. The ObjectGroup 1 810 is to be included in an Object group collection 2 (OGC2) at 845. A change trigger record 855 is created in change triggers 850 table, including a reference to the object group that is associated with the change—ObjectGroup 1 810 (OG1), a type of the initiated change—"OGC2 Create", associated object group collection with the assignment—OGC2, and a status of processing for the change for the object group collection definition. The record 855 defines a status of the trigger to be "False", as the trigger is created as a record in table 850, once the change is applied for the definition of object group collection, and is about to be processed to update relevant date affected by such a change.

When a change trigger with a processed status of "False" is present at the Change Triggers 850 table, then the Explosion table 860 is not corresponding to the current state of assignments of object groups and/or definitions of object group collection items.

In one embodiment, stored changes reflect on the content of an explosion table, such as explosion table 860, defined in relation to the hierarchy organization and object group collections. The explosion table 860 may be similar to the explosion table described and discussed in relation to the explosion table 650, FIG. 6. The explosion table 860 includes 3 rows corresponding to the three groups defined—ObjectGroup 1 810. ObjectGroup 1.1 820, and ObjectGroup 1.2, together with their inclusion into Object Group Collection items, and an authorization group determined from the three groups.

Figure 9:
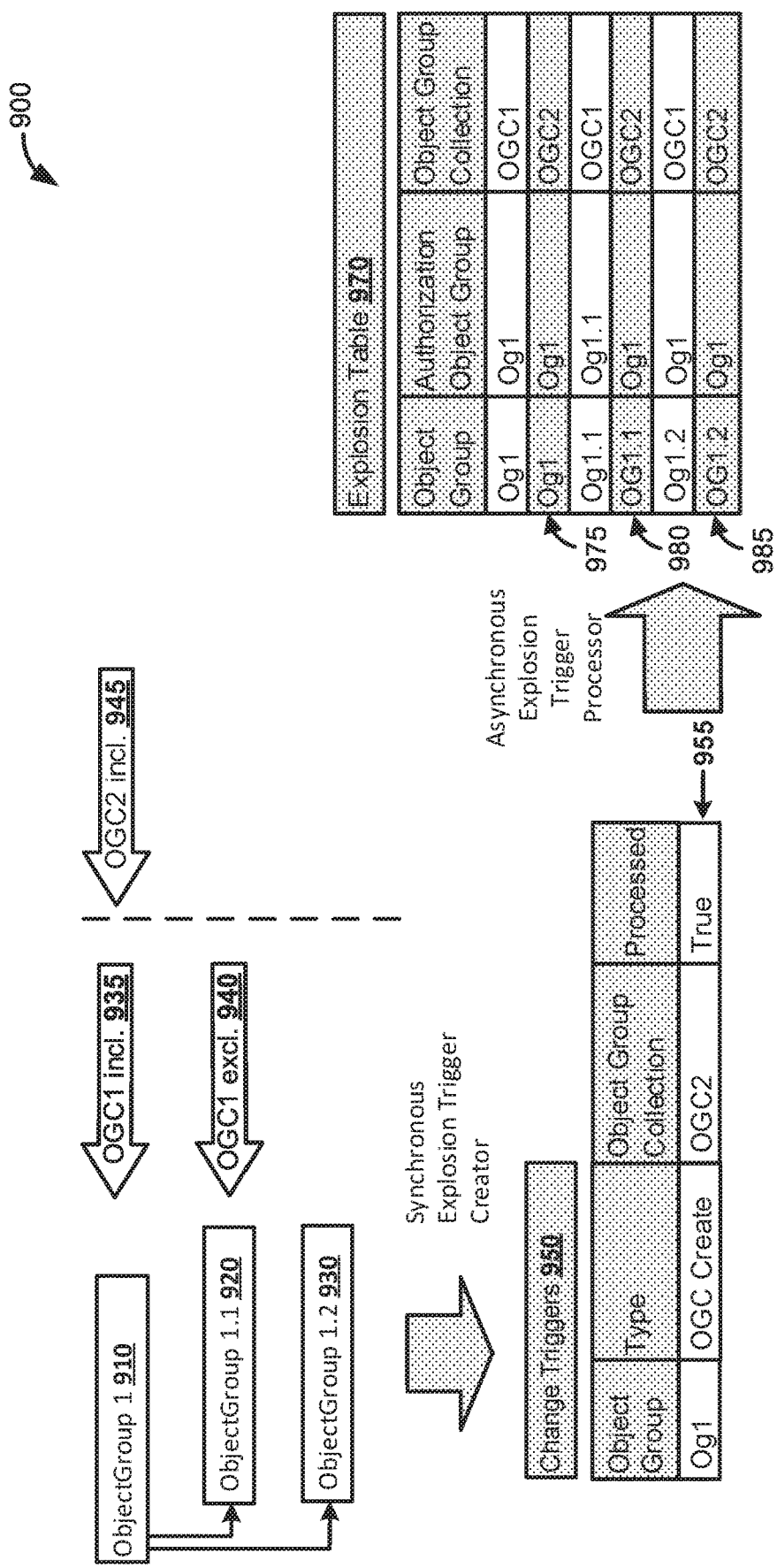
FIG. 9 is a block diagram illustrating explosion table asynchronous update process based on stored triggers for changes associated with objection group collection definitions and hierarchy group organization, according to one embodiment.

FIG. 9 is a block diagram illustrating explosion table asynchronous update process 900 based on stored triggers for changes associated with objection group collection definitions and hierarchy group organization, according to one embodiment. In one embodiment, a hierarchy of object group is defined to include ObjectGroup 1 910, ObjectGroup 1.1 920, ObjectGroup 1.2 930. The defined hierarchy of object group may be the same as the discussed object group hierarchy in FIG. 6 and FIG. 8.

In one embodiment, assignments of object groups to object group collections are defined. Object group collection 1 (OGC1) includes ObjectGroup 1 910, as defined at 935, and OGC1 excludes ObjectGroup 1.1 920, as defined at 940. The ObjectGroup 1 910 is included in an Object Group Collection 2 (OGC2) at 945.

Object Group Collection 2 (OGC2) is defined to include ObjectGroup 1 910. A change triggers 950 table is created, where a change trigger is stored synchronously with the defining the assignment of ObjectGroup 1 910 to OGC2. The change trigger is stored at row 955 and defines that OG1 910 is assigned to OGC2, and the type of the change performed is of "OGC create" type, and the processed status is false. The type of the change may be different and defines whether the change is associated with modifications to definitions of object group collection items or the definition of the hierarchy of object groups. For example, the definition of object group collection items may be modified through creating a new collection item, or further conditioning a definition of an existing object group collection item, etc. In some examples, the definition of the hierarchy of object groups may be modified to include more object groups, or to move an association of an object group within the hierarchy to an other hierarchy level, lower or upper, to assign an object group to another branch at a same or different level, to modify a definition of an object group, to delete an object group, etc.

The process status defines whether the change as performed for the creation of the object group collection—OGC2, is not reflected in an explosion table defined, such as the explosion table 970. The explosion table 970 may be such as the explosion table 860. FIG. 8. The stored change trigger at row 955 is asynchronously processed from the creation of the trigger. The processing of the change trigger at row 955 is processed alone, without other change triggers from the change triggers 950 table, as there are no other record in the table 950 that are associated with the same object group. The explosion table 970 is updated based on the processed change trigger at row 955 based on the details from the change triggers 950 table, the hierarchy definition and the existing collection definitions.

The change trigger at row 955 is associated with a root node—ObjectGroup 1 910, which is to be included in OGC2, which is a newly defined object group collection item. The explosion table 970 is updated to include 3 additional rows—975, 980, and 985, corresponding to the included group—ObjectGroup 1 910, and the inherent object groups as defined in the hierarchy—ObjectGroup 1.1 920, ObjectGroup 1.2 930.

For example, row 975 is added to define the assignment of the ObjectGroup 1 910 to the OGC2, as it is authorized by the authored object group defined as included in OGC2. Row 980 is added to define the assignment of the ObjectGroup 1.1 920, as an inherent object group to the ObjectGroup 1 910, where the ObjectGroup 1 910 is the authorizing object group. Row 985 is added to define the assignment of the ObjectGroup 1.2 930, as an inherent object group to the ObjectGroup 1 910, where the ObjectGroup 1 910 is the authorizing object group.

Figure 10:
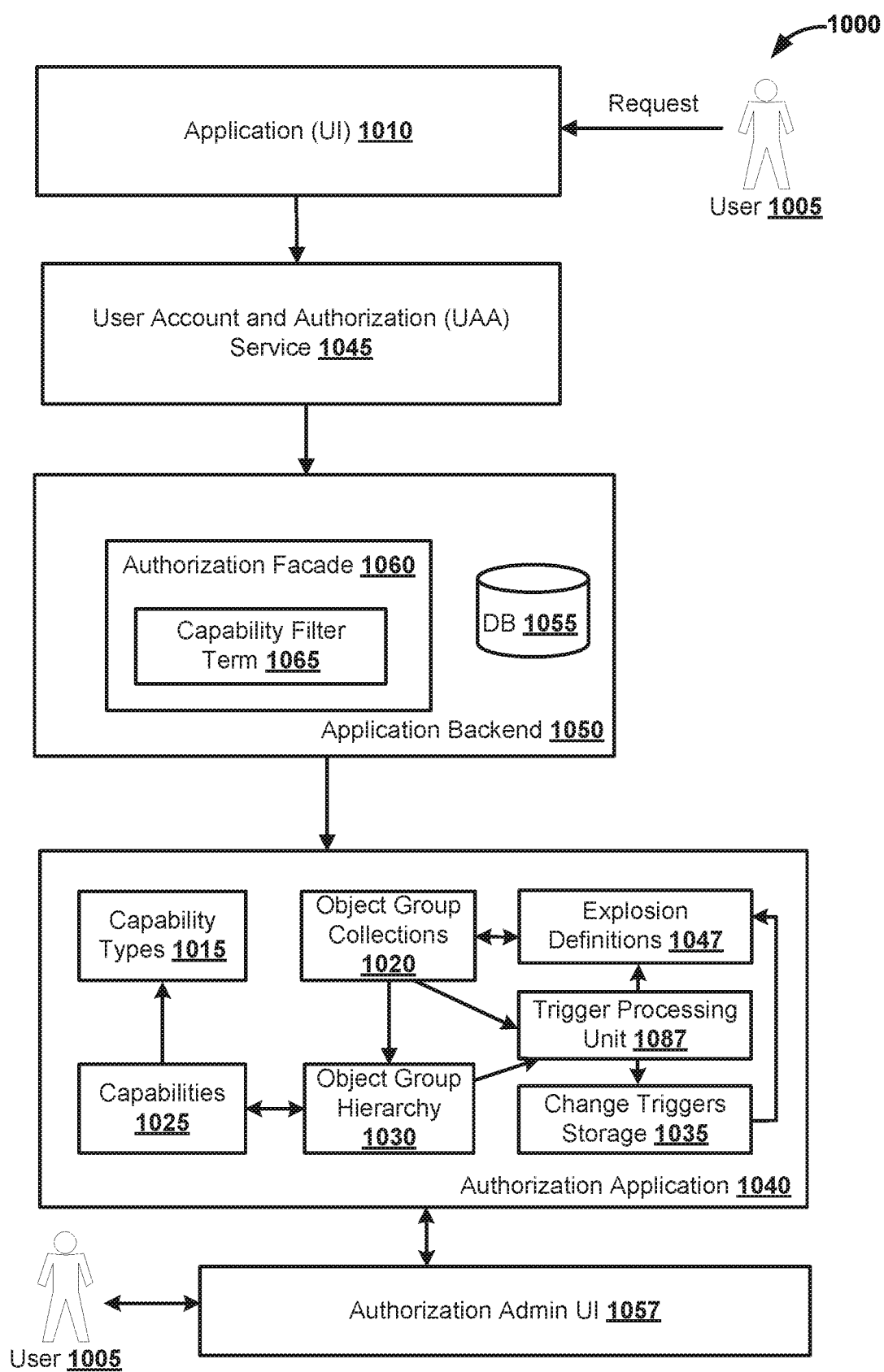
FIG. 10 a system for determining authorization rights based on information stored in maintained explosion table and hierarchy organization with stored assignments, according to one embodiment.

FIG. 10 is a block diagram illustrating a system 1000 for determining authorization rights for executing an action based on attributes and hierarchy organization, according to one embodiment. An application 1010 receives user requests, for example, from user 1005. Users of the application 1010 may be divided into user groups based on their role when working with the application 1010. Additionally, users may be associated with different accounts for customers, which may be denoted as tenants. The application 1010 may be a user interface (UI) application associated with an application backend 1050. The application backend 1050 includes implementation logic for providing functionality to users through the application 1010. The application backend 1050 handles data storage and data management. The application backend 1050 includes a database (DB) 1055 to store data in-memory. The application backend 1050 stored data according to a data model. For example, the stored data may be associated with logistic operations related to products provided from different customers at different location facilities. In such an example, the data for the products, customers, locations, etc. may be stored according to a data model defining a set of tables, which are connected based on key identifiers (IDs). Through the UI of the application 1010, access to object instances may be provided, when received requests are authenticated and authorization checks are performed. For example, a received request may be associated with reading information for a product "X". Therefore, when such a request is received, the user that sends such a request has to be checked whether he/she is authorized to access and read information for product "X". The definition of authorization rights may be stored are checked, once a request requiring authorization for performing an action is received.

In one embodiment, once a request is received at the application 1010, the application 1010 communicates the received information with a User Account and Authorization (UAA) service 1045. The UAA service 1045 may enrich the received request information with information about a user group to which the user is assigned and about an account (tenant) information, which is associated with the user. The enriched information from the UAA service 1045 is provided to the application backend 1050, where the authorization facade 1060 is invoked to determine authorization. The authorization facade 1060 takes the information for the received request, information for user groups and tenant information. The authorization facade 1060 communicated with an authorization application 1040 to receive input associated with capabilities, object group hierarchy, and object group collections.

The authorization application 1040 is instantiated to include implemented logic related to authorization of user to perform actions over object instances. The authorization facade 1060 invokes the authorization application 1040, when generating a capability filter term 1065. The generated capability filter term 1065 may be executed as part of a query over a database storing information for the objects.

The authorization application 1040 includes a definition of capability types 1015, capabilities 1025, object group collections 1020, and object group hierarchy 1030. Further, the authorization application 1040 includes explosion definitions 1047, which define corresponding associations between a group from the object groups defined in the object group hierarchy 1030, with an object group collection(s) from the object group collections 120. The explosion definitions 1047 may be such as the defined application table 970, FIG. 9. When a change in the object group hierarchy is made and/or a change in the defined object group collections 1020 is made, a record for the change is stored in change triggers storage 1035. The collection of data for the change to be put into the record is collected through trigger processing unit 1087. Stored records associated with changes in the hierarchy and/or definitions of collections are processed in batches, and then updates to the explosion definitions 1047 are made. A number of records from the change triggers storage 1035 to be processed at once is determined based on evaluation of hierarchical relations between object groups associated with the records. For example, if more than one records stored at the change trigger storage 1035 are related to one object group, they are processed at once. Further, if a record to be processed is associated with an object group, where a direct inherently associated object group is also listed in a subsequent record from the storage 1035, they are also processed at once. Based on such evaluation, a batch of records is determined for a synchronous processing.

In one embodiment, the trigger processing unit 1087 may be implemented as an instance to perform an update process, which includes the following logical steps:
1. periodically checking the change trigger storage 1035 table for not yet processed triggers for explosion table updates
2. determining the eldest not yet processed trigger and starting the processing with calculating the changes that are caused by the change associated with the trigger on the explosion table entries for the current object group. If there are younger triggers for the current object group, these additional changes are also incorporated into the calculation for the explosion update
3. Starting from this entry point in the hierarchy the changes in the explosion table are cascaded downwards along the hierarchy of object groups and at each node of the hierarchy, the related not yet processed triggers from the change trigger table (at the change trigger storage 1035) are incorporated into the calculation if they refer to the evaluated object group node.
4. At the end of the processing, the explosion table is to be updated with the changes and the triggers are to be marked as completed, for example within the same database commit.

In one embodiment, the implemented logic for processing change triggers to update explosion definitions may be defined as a real minimum delta calculation with respect to the necessary changes on the explosion table.

In one embodiment, key figures for measuring the quality of explosion update service with respect to the change trigger processing latency may be defined. Such key figures may include a current trigger processing latency and a maximum past trigger processing latency. When the current trigger processing latency is greater than a threshold time value. e.g. 60 seconds, alerts may be sent. The definition of alert notifications may be configured to an acceptable condition and threshold value to the customers and/or users of the system.

The capability types 1015 may be such as the capability type 250, FIG. 2. The capability types 1015 include definitions of vocabularies, which are associated providing authorization to perform actions over objects associated to the application backend 1050. A capability type from the capability types 1015 is associated with a data model, based on which object instances are created and handled by the application backend 1050 and the application 1010. The capability types 1015 are also based on the object group collections 1020, which are collections of groups of objects. The organization of object groups has a hierarchical manner. The capability types 1015 are associated with attributes of entities from a data model to describe the objects associated with the application 1010. Based on the capability types 1015, capabilities 1025 are created, which specify how to determine which object instances are associated with which actions to be performed by which users.

The authorization facade 1060 takes the information about the capabilities 1025 for capabilities types 1015, and generates the capability filter term 1065, which may be executed on the database, where object instance data is stored. The capability filter term 1065 may be generated based on the conditions defined in relevant capabilities from the capabilities 1025. The capability filter term 1065 may be verified through a verification check performed based on the capability types 1015 provided from the authorization application 1040. The capability types 1015 include the vocabulary, which is used for defining conditions in the capabilities 1025. The vocabulary is also used when generating the capability filter term. The capability filter term may be used as a where clause in a query that is executed on a database such as the DB 1055. When the query is executed, an authorization result may be generated and provided back to the application 1010 to the user 1005.

The authorization application 1040 may communicate with an authorization Admin UI 1057. The Administration Admin UI 1057 may be accessed by users, such as user 1005. The user 1005 may be an administrator to define authorization rights for objects associated with the application backend 1050, where the authorization rights are defined at the authorization application 1040. The user 1005 may interact with the authorization admin UI 1057 to request changes in hierarchical organization defined in object group hierarchy 1030 and/or changes related to definition of object group collections 1020.

Examples of changes and updates, initiated through the authorization Admin UI 1057, which may be associated with storing trigger records at Change Trigger Storage 1035 are:
1. A new object group is created
2. An object group is deleted
3. An object group is reassigned to a new parent object group in the object group hierarchy defined at the object group hierarchy 1030
4. A new object group collection item is created
5. An object group collection item is deleted First three of the examples above are associated with changes and modifications in the object groups and object group hierarchy, whereas the latest two are associated with changes in defined capabilities for object groups, and more specifically associating object groups to object group collection items as discussed above in relation to FIG. 1 to 9.

In one embodiment, when changes to the object group hierarchy 1030 are made and/or changes to the object group collections 1020, then an update to the explosion definitions 1047 may be performed. Such changes may be associated with storing trigger records in the change triggers storage 1035, and when a set of triggers is stored, some of the trigger records may be processed synchronously, for example when they are associated with hierarchically related object groups.

Figure 11:
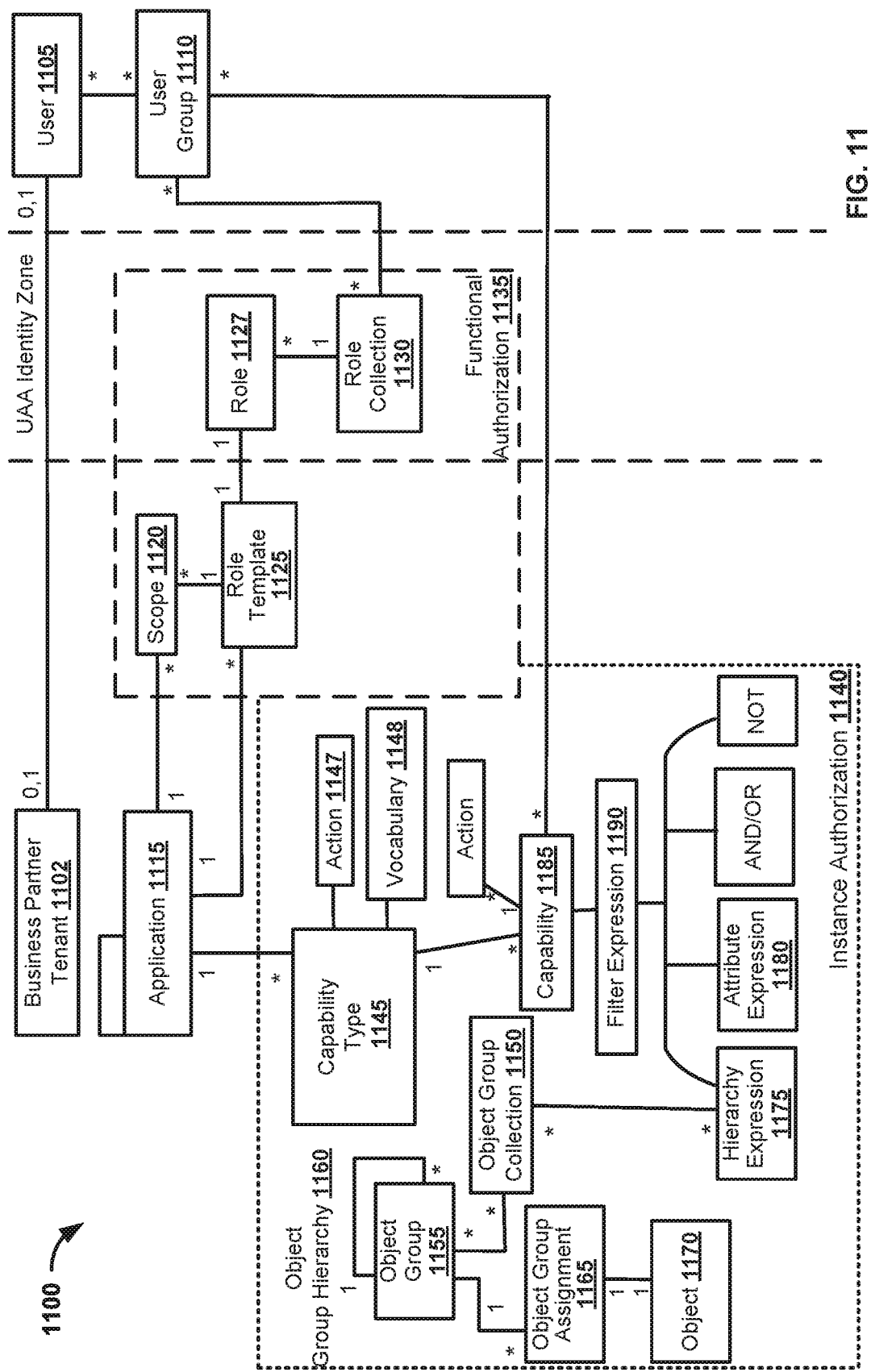
FIG. 11 is a block diagram illustrating an architectural structure of a system environment for determining authorization rights for executing an action based on attributes and hierarchy organization, according to one embodiment.

FIG. 11 is a block diagram illustrating an architectural structure of a system environment 1100 for determining authorization rights for executing an action based on attributes and hierarchy organization, according to one embodiment. An application 1115 is defined for providing services to users, such as user 1105. The user 1105 is part of an account for a business partner tenant 1102. The account of the business partner tenant 1102 is defined for the application 1115 in relation to performing actions and operations provided through the functionality of the application 1115. The user 1105 is associated with a user group 1110. The application 1115 is associated with scope 1120. The application 1115 may be associated with a number of scopes such as scope 1120. The scope 1120 is associated with a role template 1125. Multiple scopes may be related to one role template. The scope 1120 defines authorization right for performing actions through the application 1115 over object instances associated with the application 1115. Based on the role template 1125, a role 1127 may be defined to be associated with the set of scopes. For the application 1115, a number of roles may be defined according to a number of role templates. The number of roles, such as role 1127, may be grouped to form a role collection 1130. A role collection 1130 may be mapped to a user group 1110. The mapping between role collection 1130 and user group 1110 may be many to many. The definition of scopes (such as scope 1120), roles (such as role 1127), based on role templates (such as role template 1125), and role collections of roles, represent functional authorization 1135 for users associated with the application 1115.

In one embodiment, an instance authorization 1140 may be defined for the application 1115. The instance authorization 1140 is associated with attribute characteristics of object instances and with hierarchy organization of the object instances. For the application 1115, a capability type 1145 may be defined. The capability type 1145 is associated with an action 1147 and a vocabulary 1148. The capability type 1145 may be such as the capability type 250, FIG. 2. The action 1147 includes actions, which may be performed on object instances associated with the application 1115. The vocabulary 1148 includes a definition of attributes and assignment of objects to object groups and object group collections according to a hierarchy organization. The definition of attributes is associated with authorization to perform an action by a user over object instances, related to object 1170. The assignment of objects to object groups and object group collection is related to an object group hierarchy 1160.

The object group hierarchy 1160 is based on an object group 1155. The object group hierarchy 1160 is related to a number of object groups. The object group hierarchy 1160 may be presented as a tree organization, where an object group is defined as a node of the hierarchy. The object group 1155 includes a number of objects, such as object 1170. The object 1170 is associated with an object group assignment 1165 record. One object, such as object 1170 may be associated with one object group assignment. An object group, such as object group 1155 is associated with a number of object group assignments of objects, as a group includes a set of objects. Based on the object group hierarchy 1160, object group collection 1150 is defined. The object group collection 1150 is associated with a number of object groups from the object group hierarchy 1160. The object group 1155, the object group hierarchy 1160, and the object group collection 1150 may be such as those discussed in relation to FIG. 4 and FIG. 5. The object group collection 1150 may be defined to include or exclude object groups. The definition of object group collections may be associated with generation of explosion tables, such as the discussed explosion table (Table 3) above and the discussion in relation to FIG. 4 and FIG. 5.

Based on the capability type 1145, a capability 1185 is defined. The capability 1185 includes conditions, such as conditions based on the vocabulary 1148. The condition is defined according to the vocabulary 1148. The capability 1185 is related to one or more actions, which actions are selected from the actions from the capability type, as in the action 1147 block. The capability 1185 is related to a definition of a filter expression 1190. The filter expression 1190 includes a hierarchy expression 1175, attribute expression 1180, and operators such as "AND" and "OR", or a negation "NOT". The hierarchy expression 1175 is related to assignment of objects to object groups and object group collections. The attribute expression 1180 is related to definition of attributes associated with authorization to perform an action by a user, as defined in the vocabulary 1148. The relation between an object group collection 1150 and a hierarchy expression 1175 is many to many. The definition of the filter expression 1190 is unified in relation to generating both hierarchy expressions and attribute expressions. Such filter expression 1190 may be used in a query where clause and executed in a database environment. Examples of filter expressions are presented in Table 5.

TABLE 5

| |
|---|
| Entity.Tenant = ‚T1' |
| Entity.Tenant = ‚T1' AND assignment1.ObjectGroup IN (OGC1.1) |
| Entity.Tenant = ‚T1' AND <attributeSelection1> |
| Entity.Tenant = ‚T1' AND (assignment1.ObjectGroup IN (OGC1.1)) AND <attributeSelection1> |
| Entity.Tenant = ‚T1' AND (assignment1.ObjectGroup IN (OGC1.1)) OR <attributeSelection1> |
| Entity.Tenant = ‚T1' AND (assignment1.ObjectGroup IN (OGC1.1) AND <attributeSelection1> OR assignment1.ObjectGroup IN (OGC1.2) AND <attributeSelection2> ) |
| Entity.Tenant = ‚T1' AND assignment2.ObjectGroup IN (OGC2.1) |

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape: optical media such as CD-ROMs. DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 12 is a block diagram of an exemplary computer system 1200. The computer system 1200 includes a processor 1205 that executes software instructions or code stored on a computer readable storage medium 1255 to perform the above-illustrated methods. The processor 1205 can include a plurality of cores. The computer system 1200 includes a media reader 1240 to read the instructions from the computer readable storage medium 1255 and store the instructions in storage 1210 or in random access memory (RAM) 1215. The storage 1210 provides a large space for keeping static data where at least some instructions could be stored for later execution. According to some embodiments, such as some in-memory computing system embodiments, the RAM 1215 can have sufficient storage capacity to store much of the data required for processing in the RAM 1215 instead of in the storage 1210. In some embodiments, all of the data required for processing may be stored in the RAM 1215. The stored instructions may be further compiled to generate other representations of the instructions and dynamically stored in the RAM 1215. The processor 1205 reads instructions from the RAM 1215 and performs actions as instructed. According to one embodiment, the computer system 1200 further includes an output device 1225 (e.g., a display) to provide at least some of the results of the execution as output including, but not limited to, visual information to users and an input device 1230 to provide a user or another device with means for entering data and/or otherwise interact with the computer system 1200. Each of these output devices 1225 and input devices 1230 could be joined by one or more additional peripherals to further expand the capabilities of the computer system 1200. A network communicator 1235 may be provided to connect the computer system 1200 to a network 1250 and in turn to other devices connected to the network 1250 including other clients, servers, data stores, and interfaces, for instance. The modules of the computer system 1200 are interconnected via a bus 1245. Computer system 1200 includes a data source interface 1220 to access data source 1260. The data source 1260 can be accessed via one or more abstraction layers implemented in hardware or software. For example, the data source 1260 may be accessed by network 1250. In some embodiments the data source 1260 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for maintaining explosion tables for optimized evaluation of authorization rights, the method comprising:
   receiving a request for a change associated with assignments of an object group in a hierarchy of a plurality of object groups, wherein the assignments are related to object group collections, wherein the object group collections are associated with the authorization rights and wherein the authorization rights are associated with actions to be performed on one or more object groups;
   storing, at a first time, a change trigger at an explosion update trigger table, wherein the change trigger is stored synchronously with updating a definition of the object group collections and/or updating the hierarchy according to the request;

processing, asynchronously with the storing and at a second time, wherein the second time is after the first time, the explosion update trigger table to determine changes for an explosion table associated with the change trigger, wherein the change trigger is processed with one or more other triggers associated with the object group;

updating the explosion table to reflect changes to the object group and one or more other object groups hierarchically inherent for the object group;

defining assignments to associate object instances with object groups from the hierarchy of the plurality of object groups, wherein the plurality of object groups are positioned at different hierarchy levels at the hierarchy, wherein the object groups associated with the object instances are at a lowest hierarchy level of the hierarchy; and defining the object group collections to be associated correspondingly with one or more of the plurality of object groups;

wherein the assignments are based on a vocabulary including definitions of one or more attributes of the object instances and including definitions of hierarchy assignments of object instances to a particular object group from the object groups in the hierarchy.

2. The method of claim 1, wherein the change associated with the received request is selected from the group consisting of:

a change associated with a group collection definition related to at least one object group from the plurality and a change associated with a hierarchy assignment of the object group.

3. The method of claim 1, further comprising:

defining the explosion table for the plurality of object groups, wherein the explosion table defines associations between the plurality of object groups and the object group collections, wherein the defined associations comprise inclusive associations and exclusive associations.

4. The method of claim 1, wherein the change is associated with inclusion of the object group into the object group collections and the explosion table comprises a record for the object group and comprises records for one or more inherent object groups for the included object group as defined in the hierarchy, wherein the one or more inherent object groups are not associated with exclusive associations to the object group collection.

5. The method of claim 1, further comprising:

generating an explosion collection join table through joining the explosion table with a collection table including the definitions of the object group collections based on matching object group collection identifiers and object group identifiers;

wherein a row from the explosion collection join table includes a definition of a corresponding object group, a corresponding object group collection, and an inclusion status identifying whether the corresponding object group is part of the corresponding object group collection, and wherein the corresponding object group collection is defined to exclude a specific object group from the one or more inherent object groups.

6. The method of claim 1, wherein updating the explosion table includes:

defining new records in the explosion table associated with a new defined association of the object group to a respective object group collection.

7. A computer system to determine authorization rights for executing one or more actions based on one or more attributes and a hierarchy organization of objects, comprising:

a processor;

a memory in association with the processor storing instructions related to:

receiving a request for a change associated with assignments of an object group in a hierarchy of a plurality of object groups, wherein the assignments are related to object group collections, wherein the object group collections are associated with the authorization rights and wherein the authorization rights are associated with actions to be performed on one or more object groups;

storing, at a first time, a change trigger at an explosion update trigger table, wherein the change trigger is stored synchronously with updating a definition of the object group collections and/or updating the hierarchy according to the request;

processing, asynchronously with the storing and at a second time, wherein the second time is after the first time, the explosion update trigger table to determine changes for an explosion table associated with the change trigger, wherein the change trigger is processed with one or more other triggers associated with the object group;

updating the explosion table to reflect changes to the object group and one or more other object groups hierarchically inherent for the object group;

defining assignments to associate object instances with object groups from the hierarchy of the plurality of object groups, wherein the plurality of object groups are positioned at different hierarchy levels at the hierarchy, wherein the object groups associated with the object instances are at a lowest hierarchy level of the hierarchy; and defining the object group collections to be associated correspondingly with one or more of the plurality of object groups;

wherein the assignments are based on a vocabulary including definitions of one or more attributes of the object instances and including definitions of hierarchy assignments of object instances to a particular object group from the object groups in the hierarchy.

8. The system of claim 7, wherein the change associated with the received request is selected from the group consisting of:

a change associated with a group collection definition related to at least one object group from the plurality and a change associated with a hierarchy assignment of the object group.

9. The system of claim 7, further comprising instructions related to:

defining the explosion table for the plurality of object groups, wherein the explosion table defines associations between the plurality of object groups and the object group collections, wherein the defined associations comprise inclusive associations and exclusive associations;

wherein updating the explosion table includes defining new records in the explosion table associated with a new defined association of the object group to a respective object group collection.

10. The system of claim 7, further comprising instructions related to:
- generating an explosion collection join table through joining the explosion table with a collection table including the definitions of the object group collections based on matching object group collection identifiers and object group identifiers;
- wherein a row from the explosion collection join table includes a definition of a corresponding object group, a corresponding object group collection, and an inclusion status identifying whether the corresponding object group is part of the corresponding object group collection, and
- wherein the corresponding object group collection is defined to exclude a specific object group from the one or more inherent object groups.

11. The system of claim 7, wherein the change is associated with inclusion of the object group into the object group collections and the explosion table comprises a record for the object group and comprises records for one or more inherent object groups for the included object group as defined in the hierarchy, wherein the one or more inherent object groups are not associated with exclusive associations to the object group collection.

12. A non-transitory computer-readable medium storing instructions, which when executed cause a computer system to:
- receive a request for a change associated with assignments of an object group in a hierarchy of a plurality of object groups, wherein the assignments are related to object group collections, wherein the object group collections are associated with the authorization rights and wherein the authorization rights are associated with actions to be performed on one or more object groups;
- store, at a first time, a change trigger at an explosion update trigger table, wherein the change trigger is stored synchronously with updating a definition of the object group collections and/or updating the hierarchy according to the request;
- process, asynchronously with the storing and at a second time, wherein the second time is after the first time, the explosion update trigger table to determine changes for an explosion table associated with the change trigger, wherein the change trigger is processed with one or more other triggers associated with the object group;
- update an explosion table to reflect changes to the object group and one or more other object groups hierarchically inherent for the object group;
- define assignments to associate object instances with object groups from the hierarchy of the plurality of object groups, wherein the plurality of object groups are positioned at different hierarchy levels at the hierarchy, wherein the object groups associated with the object instances are at a lowest hierarchy level of the hierarchy; and
- define the object group collections to be associated correspondingly with one or more of the plurality of object groups;
- wherein the assignments are based on a vocabulary including definitions of one or more attributes of the object instances and including definitions of hierarchy assignments of object instances to a particular object group from the object groups in the hierarchy.

13. The non-transitory computer-readable medium of claim 12, wherein the change associated with the received request is selected from the group consisting of: a change associated with a group collection definition related to at least one object group from the plurality and a change associated with a hierarchy assignment of the object group.

14. The non-transitory computer-readable medium of claim 12, further comprising instructions to:
- define the explosion table for the plurality of object groups, wherein the explosion table defines associations between the plurality of object groups and the object group collections, wherein the defined associations comprise inclusive associations and exclusive associations;
- wherein updating the explosion table includes defining new records in the explosion table associated with a new defined association of the object group to a respective object group collection.

15. The non-transitory computer-readable medium of claim 12, further comprise instructions to:
- generate an explosion collection join table through joining the explosion table with a collection table including the definitions of the object group collections based on matching object group collection identifiers and object group identifiers;
- wherein a row from the explosion collection join table includes a definition of a corresponding object group, a corresponding object group collection, and an inclusion status identifying whether the corresponding object group is part of the corresponding object group collection, and
- wherein the corresponding object group collection is defined to exclude a specific object group from the one or more inherent object groups.

16. The non-transitory computer-readable medium of claim 12 wherein the change is associated with inclusion of the object group into the object group collections and the explosion table comprises a record for the object group and comprises records for one or more inherent object groups for the included object group as defined in the hierarchy, wherein the one or more inherent object groups are not associated with exclusive associations to the object group collection.

* * * * *